July 28, 1936.  C. V. SIGLER  2,049,326

OPHTHALMIC LENS REPAIR DEVICE

Filed April 19, 1934

INVENTOR.
CLAUDE V. SIGLER
BY
*W. S. Babcock*
ATTORNEY.

Patented July 28, 1936

2,049,326

UNITED STATES PATENT OFFICE 2,049,326

OPHTHALMIC LENS REPAIR DEVICE

Claude V. Sigler, Chillicothe, Ohio

Application April 19, 1934, Serial No. 721,359

5 Claims. (Cl. 88—47)

The invention to be hereinafter described relates to ophthalmic lens repair devices.

Eye glasses or ophthalmic lenses are, in general, of two types—rimless, and framed. The present invention deals with the rimless type. The rimless type may be either of two general classes—pince-nez, or with bows or temples. In any rimless type, the lens is connected to its support at the inner and/or outer edge by what is generally referred to as an end-piece. The most widely used type of end-piece comprises two very small substantially parallel straps of strong but sufficiently flexible metal to be bent slightly toward or from each other. In one well known construction, these straps are perforated to receive a connecting screw, one perforation being also threaded to secure the screw. The straps extend from a small bar, lug or post, having perforated ears at the opposite end for the pivotal connection of a temple or bow, or for connection to a bridge end. Or at the bridge end they may be made integral with the bridge. In assembling, the end-piece is simply slipped over the edge of the lens edge until the perforations are alined with the lens perforation previously made, and the connecting screw is inserted and turned up. Because the lens is supported horizontally from its end, by such connection, each end-piece is provided with a shoe or similar metal piece formed integrally. This shoe extends from the same post, lug or block, but in the general direction of the periphery of the lens, when assembled. In completing the assembly, this shoe is pressed firmly against the lens edge, thereby counteracting any tendency of the lens to sag or drop pivotally about the end-piece connection, and thereby throw the focal center out of position. This applies whether the temples be connected at a point near the vertical center of the outer edge or end of the lens or as in the "ful-vue" type, near the vertical top. It is also correspondingly true of the connections at the inner or bridge end and it applies equally in all cases in which the screw is substituted by some other device such as in the well known "loxit" and "electro no scru", now widely used and well known.

In all connections it will be obvious that the parts must be so disposed that the respective lens will be maintained in its proper position to hold the focal center in its right position—the lens must not be tilted, or tipped, or canted one way or another, because of improper or defective connections. And, of course, similarly, the temple or bow must run off on the correct line from its end-piece connection. It must not be "cocked-up" or dropped down, or twisted from its proper direct line. Those are difficulties and troubles continually met in repairing broken lenses, as will, hereinafter, more fully appear, but which are of no consideration in new glasses from the factory. At the factory, everything is regular and standardized and fits together correctly and accurately.

As is well known, the connection to the glass lens is made by drilling a very small hole or perforation through the lens, very close to its edge—only a few millimeters inwardly therefrom. This, necessarily, weakens the glass, especially between the edge and such perforation. In case of sudden outward, excessive spreading of a temple or bow, or like movement of the bridge connection, or other sudden strains, the lens, at this point, will break out. It most frequently breaks in the form of a shallow triangle, substantially symmetrical, with the perforation at the inward point. It, also, breaks very unsymmetrically in a variety of forms.

In breaks of the above types, generally, value and use of the lens for all purposes of vision are unaffected and the lens is still thoroughly usable. The difficulty is the question of support. The point of connection has been destroyed. There is nothing to connect the regular end-piece to. To grind out and even up the irregular edge of the wall or notch of the break and then drill another or new perforation inwardly from that new edge to receive a regular normal connection would throw the temple or bridge end, respectively, out of line or position or, conversely, compel corresponding and proportionate displacement of the particular lens. And that is true regardless of whether the break is symmetrical or unsymmetrical. As is well known in the optical business, these breaks are very frequent and run into very high totals. Yet, when they occur, the general practice is, especially in the larger cities, to completely discard the lens and sell the owner a new one. And, of course, many of them are relatively expensive. The greatest loss and inconvenience to the owner is when living in a comparatively small town where the local opticians' stocks are restricted. In many cases, he does not have the necessary lens and it may be several days or even more before he can get it. The owner must then "do without", unless some "fill gap" is available. In various attempts to meet these difficulties and make it possible to continue the use of the broken lens, not only temporarily, but as long as desired, several lens repair devices have been invented. Probably the best known and most widely used is the one known as the Haynes lens repair, from the name of the inventor and patentee—Haynes, Patent 1,027,417. Other patents aiming in the same direction are: 1,087,657; 1,518,175; and 1,495,469.

The main objects of the present invention are to avoid all of the above disclosed objections and provide a simple, efficient, inexpensive, lens repair device fully and completely applicable to all breaks whether symmetrical or unsymmetrical, as far as such breaks may be at all possible of repair.

In order to more clearly disclose the construction, operation and use of the invention, reference should be had to the accompanying drawing forming part of the present application. Throughout the several figures of the drawing like reference characters designate the same parts.

Figure 2:
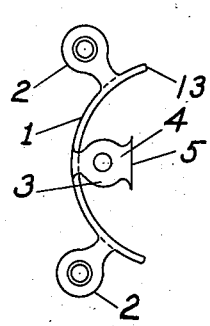
Fig. 2 is a plan view of the invention—the blank, formed.

Throughout the drawing, the parts have been multiplied in size for clearness. In the various views where parts have free surface contact, they have been shown slightly spaced—in Fig. 6, even, considerably spaced. This, again, is for clearness, to set off every part separately and individually so that it, and its relation to the other parts, will be more obvious. The whole device, assembled and in use, is very small and its different parts are not easily seen or understood except by such enlargement and exaggeration. It may be made, of course, of any suitable material such as regularly used for such connections, or any other acceptable materials. Such material will permit the device to be easily shaped or formed as desired by the particular optician or other user, with the aid of his regular tools or instruments. Yet, when so shaped, it will retain its form under all ordinary usage strains and conditions. It will be understood, that, in practice, the break will be ground so that the edge will be smooth instead of jagged, as shown. Where necessary or advisable, it will be shaped more or less in the grinding. The showing is left unground, as indicating the approximate outline of the two general types of breaks (symmetrical and unsymmetrical) to which the device is equally applicable.

Figure 1:
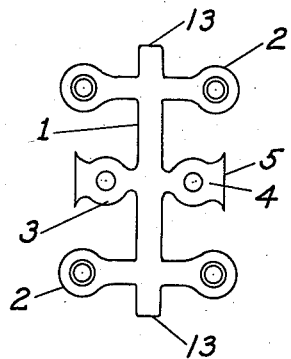
Fig. 1 is a plan view of the blank from which the invention is formed.
Figure 3:
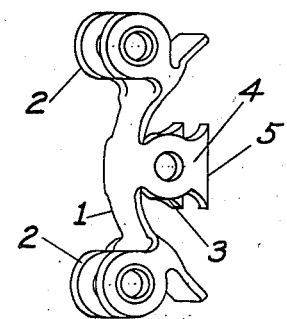
Fig. 3 is a perspective view similar to Fig. 2, and looking at the left of Fig. 2.

Referring to the invention in detail, the device may be very readily stamped from suitable material and then the blank, Fig. 1, suitably shaped as in Figs. 2 and 3. It comprises a narrow band 1 having three pairs of parallel end-piece straps 2 and 3, one pair 2, near each end and one pair 3, at the approximate longitudinal center. In the blank, of course, the parts are all in the same plane. When shaped for use, the straps 2 are folded, at the point where each joins band 1, substantially at right angles to the longitudinal center of the band and toward each other so that they fall on the same side of the band and in parallel spaced relation, separated by the width of the band. Each strap is perforated to receive the usual lens securing screw, the perforation being disposed at approximately the same distance from the band as is the perforation in the regular end-piece strap 5 from the part to which it is connected. In fact, these end-piece straps are substantially reproductions of the regular end-piece straps. The pair of straps at the center are similarly bent at right angles to band 1, but in a direction opposite to straps 2, so that they extend in the opposite direction. They are parallel to each other and spaced from each other a distance equal to the width of the band 1. Their perforations are closer to band 1 than are the perforations of straps 2—in fact, as close as it is economically practical to make them. It will be noticed that the straps 2 extend from the outer or convex side of the curve of band 1 and near each end, while straps 3 extend from the concave side from approximately the longitudinal center. Due to the fact that all straps extend at right angles to the band 1, they will also extend radially relatively to any circle of which the curved band may be a partial circumference. While it has been stated that straps 2 are perforated to receive a screw, it is to be understood that one of each pair may be provided with a shallow pocket or socket for a fusible plug connection such as the well known "loxit" or another well known electric-welded connection known as "electro-no-scru", etc.

Each of the central straps is extended slightly into a head 4 having an abutment 5 of appreciable width. This abutment is adapted to seat and be engaged by the regular shoe 6 of the standard end-piece 7 by which the regular temple or bow 8 is connected, in usual and well known manner, ordinarily to the lens. The abutment, actually, takes the place of and operates in the same manner as the lens and edge, the shoe 6 engaging it in the same manner and for the same purpose. Thus, the regular standard end-piece 7 is used for the connection. Its straps 9 are simply superposed on straps 3 so that the perforations of straps 3 are alined with the perforations of the straps 9. In that position, the regular screw is passed through and threaded into the outer strap and turned up. Or, as shown in Fig. 6, a "loxit" connection may be used. In that case, a small sleeve 10 will first be seated in the strap 3. Then the straps 9 of the regular "loxit" end-piece will be positioned and the fusible plug 11 inserted. It will be fused in well known manner, filling the locking cavity in the cover strap 9, as shown. The regular "loxit" cap 12 will then be added in usual and well known manner to "finish off" the connection. The sleeve 10 is required in applicant's invention, where a "loxit" connection is to be used, to take the place of the walls of glass around the perforation, where the "loxit" connection is regularly used, as will be clear. On the other hand, the "electro-no-scru" connection comprises a sleeve of its own and may be used, in well known manner in place of the "loxit", or the screw, as may be understood. It is understood, of course, that the temple end-piece is not connected to the repair device until after the repair device has been completely connected or assembled in place in the break, and secured to the lens as a repair. It should be stated that the length of all straps 2 and 3 are substantially the same as the length of the standard end-piece strap. Consequently, as shoe 6 engages the abutment 5, the outer edge of its perforated end will reach approximately to the adjacent face of band 1, as in Figs. 4 and 5. Likewise, the hole or holes drilled for the connection of straps 2 will fall at just about the same distance within the lens edge as for regular standard connections of temple end-pieces.

Figure 4:
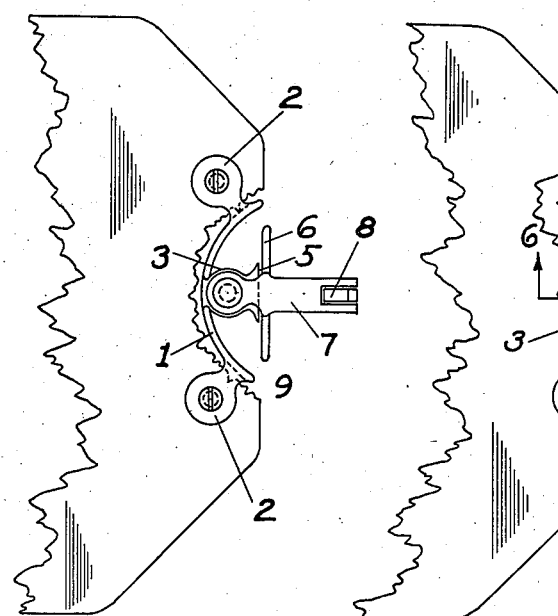
Fig. 4 is a view similar to Fig. 2, but as applied, the lens having a symmetrical break.

As previously stated, the present invention is constructed and devised to be applied to any break such as occurs frequently at the end-piece connections, whether symmetrical or unsymmetrical. As particularly adapting it for unsymmetrical breaks, the band 1 is provided with an extension tab 13 in line with and as a continuation of the band, at each end, beyond the straps 2. In applying the invention to a symmetrical break at the temple or bow end of a lens, the break will simply be rounded out and, two holes bored through the lens in position to receive the connecting means for securing the device to the lens. Of course the break will be ground to smooth the edge of the break. And, as will be understood, the holes will be bored in such positions that, when connected, the device will assume the proper position to have the temple take its correct and normal position. This is shown in Fig. 4 where, it will be noticed, the shoe 6 is in the same position that it would be in if it were engaging the lens edge and the straps 9 were connected direct to the lens itself instead of to the repair. And this applies for all symmetrical breaks, because the breaks which are not too great for repair extend from the normal lens perforation outwardly. They do not extend inwardly beyond that. Since the side walls of such breaks run out to the edge, the connections for straps 2 may be brought back almost on a line with the connection between the temple end-piece straps, or almost as far out as the original lens perforations, thus keeping the connections, as far as possible, out of the normal line of vision. With the two pairs of straps securing the lens at two points, it will be adequately supported. Should there be any possible looseness at the temple end-piece connection, abutment 5 and engaging shoe 6 will absolutely prevent any possible dropping or sagging.

Figure 5:
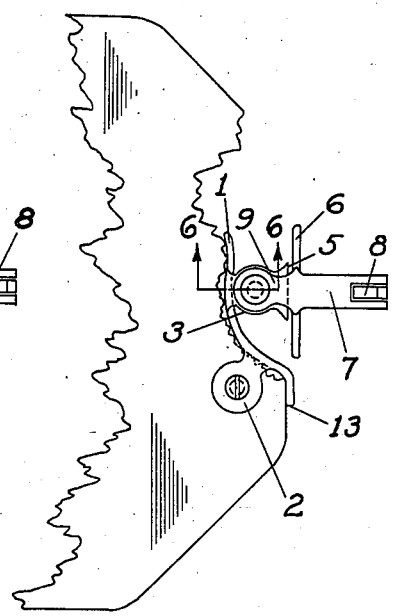
Fig. 5 is a view similar to Fig. 4, with unsymmetrical break.
Figure 6:
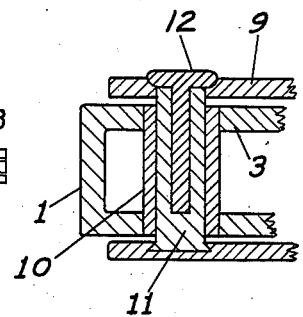
Fig. 6 is a much larger fragmentary cross section, on line 6—6 of Fig. 4, but showing a "loxit" connection.

In case of an unsymmetrical break, one type of which is shown in Fig. 5, the edge will be ground and a part of it will be shaped to receive as great a part of the device as possible, including at least the central pair of straps 3 and one end pair 2, in such position that the temple end-piece may be connected in the proper position relatively to the lens—compare Fig. 4. In that case the lens will have only one point of connection with the device instead of two. Should that become loose at all, the lens might sag or drop around it as a pivot. To prevent this, the extension tab 13 will be bent to engage the adjacent lens edge and prevent swinging in that direction. The band 1 from straps 2 to straps 3 will engage the lens edge in the other direction. Consequently, the lens will be firmly held even with only the one point of connection and can not swing in either direction—down or up. As a further stop, as much as possible of band 1 may be retained beyond straps 3 and seated on the lens edge—all as clearly shown in Fig. 5. It is hardly necessary to state that, such part of the device as can not be used because of the unsymmetrical nature of the break, is simply clipped off. Likewise, in a symmetrical break, neither tab 13 will be required and they should both be clipped off.

It is to be borne in mind that every optician will shape or fit the devices to the particular breaks that he encounters in his own particular way, both as to the symmetrical breaks and as to the unsymmetrical breaks, no two doing the same piece of work the same, probably. This device is of course equally applicable to the types where the temples or bows are connected at the far upper outer corners of the lenses.

No break which does not destroy the lens can be too wide or large for this repair device, or too unsymmetrical or irregular, because it does not bridge the break. The break surrounds, or might be said, in one sense, to bridge it. It needs only to be shaped to seat in the break so as to properly position the connected temple or bow. Consequently, it may be applied to any repairable break.

It is inexpensive, very quickly and easily applied, and after application may be left as permanent.

It is thought that the construction, operation and use of the invention will be clear from the preceding detailed description.

Many changes may be made in the construction, arrangement, and disposition of the various parts of the invention, within the scope of the appended claims, and it is meant to include all such within the present application wherein only one preferred form has been disclosed, merely by way of illustration and with no thought of in any degree limiting the invention by such disclosure.

Having described my invention what I claim and desire to protect by Letters Patent is:—

1. A lens repair device comprising, a deformable band curved longitudinally throughout its length to fit into a break in a lens edge with its convex edge inwardly of the normal lens-edge line, a pair of integrally formed parallel straps extending from opposite edges of the convex side of said band near one end thereof and spaced apart for connection to a lens, and a second pair of straps formed integrally with said band, removed longitudinally of said band from the first pair, directed oppositely relatively to the aforesaid pair of straps, said last named straps being of substantially the same length as the straps of a standard end-piece and being provided with abutments adapted to be engaged by the shoe of a standard cooperating end-piece.

2. A lens repair device comprising, a band, a pair of integrally formed parallel straps extending from opposite edges of one side of said band near one end thereof, and a second pair of integrally formed parallel straps extending in a direction oppositely to the first pair and from opposite edges of said band, said second pair being spaced longitudinally of said band relatively to said first pair, said second pair being of a length approximately equal to that of a standard cooperating end-piece strap, being provided with abutments at their outer ends adapted to engage an endpiece shoe to align the repair device, and being provided with perforations as close as practical to said band for connecting a standard end-piece.

3. A lens repair device comprising, a band, a pair of integrally formed parallel straps extending from opposite edges of one side of said band near one end thereof, a second pair of integrally formed parallel straps extending in a direction oppositely to the first pair and from opposite edges of said band, said second pair being spaced longitudinally of said band relatively to said first pair, said second pair being of a length approximately equal to that of a standard cooperating end-piece strap, being provided with abutments at their outer ends adapted to engage an end-piece shoe to align the repair device, and provided with perforations as close as practical to said band for securing an end-piece, and a lens edge engaging extension in continuation of said band beyond the first mentioned pair of straps.

4. A lens repair device blank comprising, a band, lens engaging strap members extending in opposite directions from its opposite edges at points near its opposite ends, those near the respective ends being alined, and end-piece connecting straps extending in opposite directions from opposite edges of said band at a point approximately midway between the straps near the respective ends, said end-piece connecting straps being of a length approximately equal to that of a standard cooperating end-piece strap, being provided with abutments on the outer ends for engaging and aligning an end-piece shoe, and being provided with perforations adjacent their inner ends for attachment of an end-piece.

5. A lens repair device blank comprising, a band, lens engaging strap members extending in opposite directions from its opposite edges at a point near one end and aligned one with the other, aligned end-piece connecting strap members extending in opposite directions from opposite edges of said band at a point removed, longitudinally of said band, from the first straps, said end-piece connecting straps being of a length approximately equal to that of a standard cooperating end-piece strap, being provided with abutments on their outer ends for engaging and aligning an end-piece shoe, and being provided with perforations adjacent their inner ends for attaching an end-piece, and a lens edge engaging extension in continuation of said band beyond the first mentioned pair of straps.

CLAUDE V. SIGLER.